Patented Oct. 31, 1944

2,361,372

UNITED STATES PATENT OFFICE 2,361,372

METAMETHOXYBENZYLMETHYLCARBINAMINES AND MEDICINAL PREPARATIONS COMPRISING THE SAME

Gordon A. Alles, Los Angeles, Calif.

No Drawing. Application July 5, 1938,
Serial No. 217,583

5 Claims. (Cl. 260—570.8)

This invention relates to a new composition of matter, and more particularly a synthetic organic compound, and to a medicinal preparation comprising such compound.

This application is a continuation-in-part of my application Serial No. 167,413, filed October 5, 1937, which has become abandoned.

The principal object of this invention is to provide a new composition of matter which may be used as an intermediate in the synthetic production of compounds useful for therapeutic purposes, or may itself be used as a medicinal preparation in the therapeutic treatment of animals and man.

A particular object of the invention is to provide a new and useful medicinal preparation for use in the treatment of animals and man.

The new composition in accordance with this invention will be found to have various uses as a medicinal preparation, and from the standpoint of its therapeutic characteristics, will be found effective for various purposes and particularly for simulating stimulation of the sympathetic nervous system and results therefrom, for example, for effecting vaso-constriction, for increasing cardiac output, for effecting contraction or relaxation of smooth muscle depending upon the function of the sympathetic nervous system, or for producing general or local effects resulting therefrom. The physiological actions of this new composition on animals and man may be in some respects likened to those of both epinephrine and nicotine. It may be employed in various forms, and may be variously administered. Thus, for example, it may be used as a vapor, in liquid solution forms, or in solid form such as in powders or tablets, alone or with other agents as desired, and it may be variously administered as, for example, into the nose, mouth or gastrointestinal tract, or by intravenous or subcutaneous injection.

Broadly speaking, the new composition in accordance with this invention comprises a metamethoxybenzylmethylcarbinamine from the group consisting of a base and the salts thereof, said base having the formula:

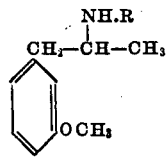

wherein R represents a member of the group consisting of hydrogen and a methyl radical. A specific embodiment of the invention comprises metamethoxybenzylmethylcarbinamine or a salt thereof, and another specific embodiment comprises metamethoxybenzylmethylcarbinmethylamine or a salt thereof. In either of these embodiments, the salts may be, for example, hydrochlorides, sulfates, oxalates, tartrates, etc.

It will be understood that by reference to a metamethoxybenzylmethylcarbinamine, in the following descriptions and claims, it is contemplated and intended that such term shall include from the broad standpoint, metamethoxybenzylmethylcarbinamine itself, the N-methyl derivative thereof, salts thereof, and salts of the N-methyl derivative.

The new composition of matter in accordance with this invention may be prepared in any desired manner, no claim to any particular method of preparation being made.

By way of illustrating suitable methods for the preparation of a new composition in accordance with this invention, a description of certain preparative methods and their specific products is herewith detailed:

*Metamethoxybenzylmethylcarbinamine.*—This substance is conveniently prepared by electrolytic reduction of the metamethoxyphenylnitropropylene which melts at 47–48° C. that results from the interaction of a mixture of equal molal quantities of metamethoxybenzaldehyde and of nitroethane in the presence of one-twentieth molal quantity of normal amylamine, on standing at room temperature for some time, preferably about two to four weeks. For reduction, one fifth gram-mol metamethoxyphenylnitropropylene, in a mixture of two-fifths liter ethanol, one-fifth liter acetic acid, and one-fifth liter twelve normal sulfuric acid, is placed in the cathode compartment of an electrolytic cell with a mercury cathode. For the anode division of the cell a porous cup containing a lead anode and a six normal sulfuric acid anolyte is used. Electric current is passed through the cell at such voltage that the amperage passing gives a cathode current density of about one-tenth ampere per square centimeter, and the temperature of the catholyte is maintained preferably between 25° and 35° C. by cooling. An excess of electric energy over the theoretically required eight faradays per mol of metamethoxyphenylnitropropylene used completes the reaction. Addition of water to the catholyte product and removal of the ethanol and acetic acid present, by distillation, and then making strongly alkaline with caustic soda, causes a basic layer to separate.

This is largely metamethoxybenzylmethylcarbinamine and it is purified by distillation under reduced pressure. The amine boils in the range 132-136° C. under pressure of 10-12 millimeters mercury.

*Metamethoxybenzylmethylcarbinamine salts.*—The hydrochloride is readily prepared as a crystalline solid by treating the amine with an excess of aqueous hydrochloric acid, evaporation, then crystallization of the residue from acetone and ether, yielding crystals which melt at 113-114° C. The sulfate is best prepared by exact neutralization of the amine with an ethanol solution of sulfuric acid, and removal of the ethanol by filtration, yielding a solid which does not melt up to 280° C. The oxalate can be prepared by mixing equal molal amounts of amine and oxalic acid in some boiling water, and then cooling, when metamethoxybenzylmethylcarbinamine binoxalate crystallizes out, and will then melt at 145-6° C. The tartrate is prepared by mixing ethanol solutions of the amine and dextrotartaric acid in equal molal amounts and adding ether, which yields a crystal powder that sinters on heating at about 95-98° C. and melts to a clear liquid at about 120-130° C.

*Metamethoxybenzylmethylcarbinmethylamine.*—Exclusive monomethylation of metamethoxybenzylmethylcarbinamine is best carried out by methylating its benzal derivative. Benzal-metamethoxybenzylmethylcarbinamine is readily made by mixing equal molal amounts of benzaldehyde and metamethoxybenzylmethylcarbinamine, then distilling, water coming over first, and then the desired benzal compound which boils at 188-190° C. under pressure of 10 millimeter mercury. Mixture of the benzal derivative and two molal equivalents of methyl iodide, and setting aside in the dark at room temperature for two weeks, completes a reaction which yields benzal-metamethoxybenzylcarbinmethylammonium iodide, a viscous glass, which is decomposed on boiling with dilute hydrochloric acid into benzaldehyde and the desired metamethoxybenzylmethylcarbinmethylamine, and this amine is precipitated out as an oil by making the solution strongly alkaline with caustic soda. The amine is purified by distillation and boils at 138-140° C. under pressure of 15 millimeters of mercury.

*Metamethoxybenzylmethylcarbin methyl amine salts.*—The hydrochloride and hydrobromide are readily prepared by treating the amine with hydrochloric or hydrobromic acids and evaporating, but are very hygroscopic and not easily obtainable crystalline. The sulfate is best prepared by exact neutralization of the amine with an ethanol solution of sulfuric acid, followed by addition of ether, yielding a solid which does not melt up to 280° C. The acid oxylate can be prepared by mixing equal molal amounts of the amine and oxalic acid in a minimum of hot water for solution, and on cooling the crystalline binoxalate comes out, which sinters on heating at about 120° C. and melts clear about 145° C. The tartrate, prepared by mixing the amine and dextrotartaric acid in equal molal amounts in ethanol, and precipitated by adding ether, is obtainable as a semi-solid due to its extremely hygroscopic character.

As an example of the use of the composition of this invention as an intermediate in the synthetic production of other compounds useful for therapeutic purposes, any of the embodiments thereof may be demethylated by known processes to yield a corresponding metahydroxybenzylmethylcarbinamine, such an amine being made the subject matter of a separate patent application executed by me concurrently herewith.

In using the broad and specific embodiments of this invention as medicinal preparations, the bases may be suitably supported in an inhaler tube and applied by inhalation for shrinking the nasal mucosa. Or, by way of another example, the bases may be dissolved in oil and locally applied to mucous membranes. The salts of the bases may be applied in oily or aqueous solutions by spraying or local contact application for shrinking congested mucous membranes. Again, for example, for effecting general vaso constriction or increasing the cardiac output, aqueous solutions of the salts may be orally administered or injected, or, if desired, a solid tableted form may be used by mouth.

The proportion of the bases or salts of the bases in the medicinal preparations, and the nature and proportions of other ingredients used, are subject to wide variation, according to the therapeutic effect to be attained and the method in which the preparation is to be administered. The bases or salts may be dissolved in or mixed with any suitable excipient, and the proportion of the bases or salts of the bases may be any proportion which is sufficient to impart effective therapeutic properties to the preparation. It may be as low as 1% or even less when used in solution, or as much as 50% or even as high as 90% in other cases, as when used as an inhalant or in solid tableted form. The pure bases or salts of the bases may be used alone to give certain therapeutic effects, although it is often preferable to add other constituents, as solvents or diluents, to impart desired physical properties, perfume, color, or the like to the liquid or solid preparation. Thus, a medicinal preparation in accordance with this invention may comprise the designated bases or salts, alone or together with a suitable excipient.

By way of illustrating suitable proportions of active ingredient and forms of a medicinal remedy in accordance with this invention, description of some such medicinal products are herewith detailed, in which the bases or their salts are mixed with other suitable ingredients as excipients.

Inhaler tubes are filled with a cotton plug moistened with 0.500 g. of pure metamethoxybenzylmethylcarbinamine base or with a mixture of 0.400 g. of pure metamethoxybenzylmethylcarbinmethylamine base and 0.100 g. menthol, the latter serving to decrease the unpleasantness of the odor of the accompanying base and to partially decrease its volatility.

Oil solutions for topical application to nasal membranes are prepared by dissolving 1.00 g. of metamethoxybenzylmethylcarbinamine up to 100 cc. with low viscosity liquid petrolatum or 0.900 g. metamethoxybenzylmethylcarbinmethylamine and 0.100 g. rose oil up to 100 cc. with low viscosity liquid petrolatum.

Aqueous solutions for topical application to eye or nasal membranes are prepared by dissolving 1.00 g. metamethoxybenzylmethylcarbinamine hydrochloride in 100 cc. of water saturated with boric acid, this water solution serving as an effective sterile diluting agency for the therapeutically active salt.

Sterile ampule vials containing dry metamethoxybenzylmethylcarbinmethylamine sulfate for preparation of solutions for parenteral injections are filled with 20 mg. of the pure salt, or with a mixture of 20 mg. of the pure salt and 9 mg. of sodium chloride, so that on use by addition of 1.0 cc. sterile water a solution physiological in sodium chloride content is obtained.

Elixirs for oral administration of the salts of the bases are well prepared by dissolving 5 g. of the desired salt in 100 cc. water and adding 125 cc. ethanol, 10 cc. of lemon flavor concentrate and 765 cc. of 60% simple sucrose syrup, which may be tinted with a certified dyestuff.

Tablets for hypodermic solution preparations are made as triturate tablets of 20 mg. metamethoxybenzylmethylcarbinamine hydrochloride or the corresponding tartrate without admixture of any other substance while tablets for oral administration are prepared by compressing a granulated mixture of 10, 20, or 50 mg. metamethoxybenzylmethylcarbinmethylamine sulfate with 90, 80, or 50 mg. respectively of lactose which may if desired be flavored with a trace of vanillin or similar substance.

I claim:

1. A metamethoxybenzylmethylcarbinamine of the group consisting of metamethoxybenzylmethylcarbinamine and salts thereof.
2. Metamethoxybenzylmethylcarbinamine.
3. A salt of metamethoxybenzylmethylcarbinamine.
4. Metamethoxybenzylmethylcarbinamine hydrochloride.
5. Metamethoxybenzylmethylcarbinamine sulfate.

GORDON A. ALLES.